US 6,614,580 B2

(12) United States Patent
Amm

(10) Patent No.: US 6,614,580 B2
(45) Date of Patent: Sep. 2, 2003

(54) MODULATION OF LIGHT OUT OF THE FOCAL PLANE IN A LIGHT MODULATOR BASED PROJECTION SYSTEM

(75) Inventor: David T. Amm, Kingston (CA)

(73) Assignee: Silicon Light Machines, Sunnyvale, CA (US)

( * ) Notice: Subject to any disclaimer, the term of this patent is extended or adjusted under 35 U.S.C. 154(b) by 148 days.

(21) Appl. No.: 09/832,699

(22) Filed: Apr. 10, 2001

(65) Prior Publication Data

US 2002/0145806 A1 Oct. 10, 2002

(51) Int. Cl.$^7$ ............................ G02B 26/00; G02B 26/08
(52) U.S. Cl. ......................... 359/290; 359/237; 359/298
(58) Field of Search ............................... 359/290, 291, 359/298, 558, 571, 573, 708; 353/100, 101; 372/20

(56) References Cited

U.S. PATENT DOCUMENTS

| 4,011,009 A | * | 3/1977 | Lama et al. ................. 359/571 |
| 5,185,660 A | | 2/1993 | Um ............................. 348/755 |
| 5,311,360 A | | 5/1994 | Bloom et al. ................. 359/572 |
| 5,764,280 A | | 6/1998 | Bloom et al. .................. 348/53 |
| 5,808,797 A | | 9/1998 | Bloom et al. ................. 359/572 |
| 5,841,579 A | | 11/1998 | Bloom et al. ................. 359/572 |
| 5,919,548 A | | 7/1999 | Barron et al. ................. 428/138 |
| 5,923,475 A | | 7/1999 | Kurtz et al. .................. 359/610 |
| 5,982,553 A | | 11/1999 | Bloom et al. ................. 359/627 |
| 5,995,303 A | * | 11/1999 | Honguh et al. .............. 359/708 |
| 6,069,392 A | | 5/2000 | Tai et al. ....................... 257/419 |
| 6,084,626 A | | 7/2000 | Ramanujan et al. ........ 347/239 |
| 6,122,299 A | * | 9/2000 | DeMars et al. ................ 372/20 |
| 6,123,985 A | | 9/2000 | Robinson et al. ............ 427/162 |
| 6,169,624 B1 | | 1/2001 | Godil et al. ................. 359/237 |
| 6,215,579 B1 | * | 4/2001 | Bloom et al. ................. 359/298 |

FOREIGN PATENT DOCUMENTS

| EP | 1 003 071 A2 | 5/2000 | ........... G03B/27/72 |
| EP | 1 040 927 A2 | 10/2000 | ........... B41J/2/455 |
| JP | 322714 A2 | * 5/1989 | ........... G02B/5/30 |
| WO | WO 99/67671 | 12/1999 | ........... G02B/26/08 |

OTHER PUBLICATIONS

Apte et al., "Deformable Grating Light Valves for High Resolution Displays," Solid State Actuator Workshop, Hilton Head, South Carolina, Jun. 13–16, 1994.
Sene et al., "Polysilicon micromechanical gratings for optical modulation," Sensors and Actuators, vol. A57, pp. 145–151, 1996.
Amm et al., "*Invited Paper*: Grating Light Valve™ Technology: Update and Novel Applications," SID Digest, vol. 29, 1998.
"Development of Digital MEMS–Based Display Technology Promises Improved Resolution, Contrast, And Speed", XP–000730009, 1997, p. 33 of 34.

* cited by examiner

Primary Examiner—Georgia Epps
Assistant Examiner—Gary O'Neill
(74) Attorney, Agent, or Firm—Haverstock & Owens LLP

(57) ABSTRACT

A display apparatus projects an image onto a display screen and includes a grating light valve, a focusing arrangement and a scanning device. The grating light valve is located near but not at a focal plane of a line illumination such that in operation the grating light valve produces real or virtual two dimensional images. The grating light valve is configured such that the modular members on the surface of the grating light valve are neither parallel nor perpendicular to the effective pixel are, thereby arranged diagonally across the pixel area in order to eliminate any imperfections or defects in the line illumination. A seal glass is coupled with the grating light valve and forms an air gap between itself and the grating light valve such that the line illumination must pass through the seal glass and the air gap before reaching the grating light valve. Additionally, an absorbing aperture is affixed to the surface of the seal glass at the focal point of the line illumination in order to further filter background light.

38 Claims, 10 Drawing Sheets

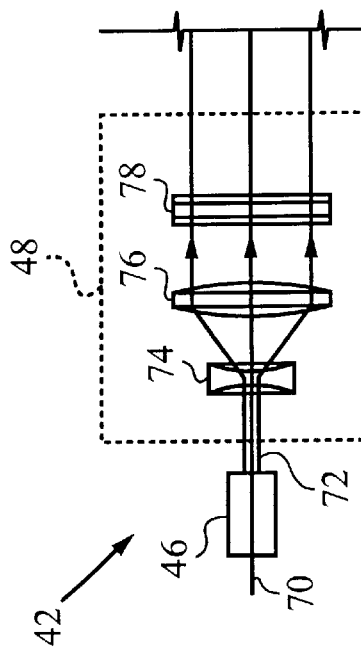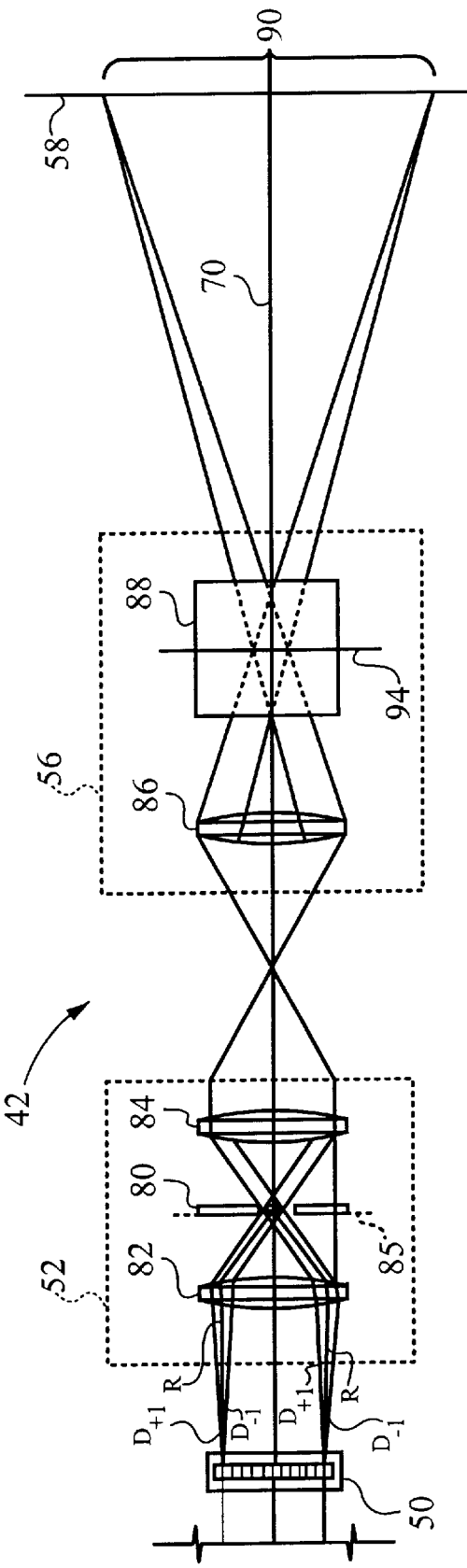

MODULATION OF LIGHT OUT OF THE FOCAL PLANE IN A LIGHT MODULATOR BASED PROJECTION SYSTEM

FIELD OF THE INVENTION

This invention relates to the field of image projectors. More particularly, this invention relates to the field of modulation of light out of the focal plan in a grating light valve based projection system.

BACKGROUND OF THE INVENTION

In recent years, light modulators have been developed using MEMS (micro-electro-mechanical systems) technology in which moveable elements are configurable to direct light. An example of such light modulators is a grating light valve type device (GLV type device) taught in U.S. Pat. No. 5,311,360 to Bloom et al., in which the GLV type device is configurable in a reflecting mode and a diffracting mode. The GLV type device taught by Bloom et al. is isometrically illustrated in FIG. 1. The GLV type device 10 includes moveable elongated elements 12 suspended over a substrate 14.

A first side view of the GLV type device 10 of the prior art is illustrated in FIG. 2A, which shows the GLV type device 10 in the reflecting mode. The moveable elongated elements 12 each include a first reflective coating 16. Interspersed between the moveable elongated elements 12 are second reflective coatings 18. In the reflecting mode, upper surfaces of the first and second reflective coatings, 16 and 18, are separated by a height difference of a half wavelength $\lambda/2$ of incident light I. The incident light I reflecting from the second reflecting coatings 18 travels a full wavelength further than the incident light I reflecting form the first reflecting coatings 16. So the incident light I, reflecting from the first and second reflecting coatings, 16 and 18, constructively combines to form reflected light R. Thus, in the reflecting mode the GLV type device 10 produces the reflected light R.

A second side view of the GLV type device 10 of the prior art is illustrated in FIG. 2B, which shows the GLV type device in the diffracting mode. To transition from the reflecting mode to the diffracting mode, an electrostatic potential between the moveable elongated elements 12 and the substrate 14 moves the moveable elongated elements 12 to contact the substrate 14. To maintain the diffracting mode, the electrostatic potential holds the moveable elongated elements 12 against the substrate 14. In the diffracting mode, the upper surfaces of the first and second reflective coatings, 16 and 18, are separated by a quarter wavelength $\lambda/4$ of the incident light I. The incident light I reflecting from the second reflecting surfaces 18 travels a half wavelength further than the incident light I reflecting from the first reflective coatings 16. So the incident light I, reflecting from the first and second reflecting coatings, 16 and 18, destructively interferes to produce diffraction. The diffraction includes a plus one diffraction order $D_{+1}$ and a minus one diffraction order $D_{-1}$. Thus, in the diffracting mode, the GLV type device 10 produces the plus one and minus one diffraction orders, $D_{+1}$ and $D_{-1}$.

A first alternative GLV type device of the prior art is illustrated in FIGS. 3A and 3B. The first alternative GLV type device 10A includes first elongated elements 22 interdigitated with second elongated elements 23. The first elongated elements 22 include third reflective coatings 26; the second elongated elements 23 include fourth reflective coating 28. In the reflecting mode, illustrated in FIG. 3A, the third and fourth reflective coatings, 26 and 28, are maintained at the same height to produce the reflected light R. In the diffracting mode, illustrated in FIG. 3B, the first and second reflected coatings, 26 and 28, are separated by the second height difference of the quarter wavelength $\lambda/4$ of the incident light I to produce the diffraction including the plus one and minus one diffraction orders, $D_{+1}$ and $D_{-1}$.

A display system utilizing a GLV type device is taught in U.S. Pat. No. 5,982,553 to Bloom et al. The display system includes red, green, and blue lasers, a dichroic filter group, illumination optics, the GLV type device, Schlieren optics, projection optics, a scanning mirror, and display electronics, which project a color image onto a display screen. The red, green, and blue lasers, driven by the display electronics and coupled to the GLV type device (via the dichroic filter group and the illumination optics) sequentially illuminate the GLV type device with red, green, and blue illuminations. The GLV type device, driven by the display electronics, produces a linear array of pixels which changes with time in response to a signal from the display electronics, each pixel configured in the reflecting mode or the diffracting mode at a given instant in time. Thus, the GLV type device produces sequential linear arrays of red, green, and blue pixels with each of the red, green, and blue pixels in the reflecting mode or the diffracting mode.

The red, green, and blue pixels are then coupled to the Schlieren optics which blocks the reflecting mode and allows at least the plus one and minus one diffraction order, $D_{+1}$ and $D_{-1}$, to pass the Schlieren optics. Thus, after passing the Schlieren optics, the linear arrays of the red, green, and blue pixels have light pixels corresponding to the pixels at the GLV type device in the diffracting mode and dark pixels corresponding to pixels at the GLV type device in the reflecting mode. The projection optics (via the scanning mirror) project the linear arrays of the red, green, and blue pixels onto the display screen while the scanning mirror, driven by the display electronics, scans the linear arrays of the red, green, and blue pixels across the display screen. Thus, the display system produces a two dimensional color image on the display screen.

A graphical top cross sectional view of a GLV type device is illustrated in FIG. 4. A scale in millimeters is provided to show an approximate layout of the system. In a system such as this, the GLV type device 10 is positioned such that the focal point 36 of the incident light I is located on the surface of the GLV type device 10. A seal glass 34 is positioned over the GLV type device 10 forming an air gap 32 between the GLV type device 10 and the seal glass 34. In this prior art embodiment, the seal glass 34 permits the incident light I to pass to the air gap 32 and then to the GLV type device 10. The reflected light R travels through the air gap 32 and the seal glass 34 before a portion of the reflected light R is reflected by an outer surface 38 of the seal glass. As depicted in FIG. 4, this second reflected light $R_2$ eventually leaves the seal glass at a different point than the reflected light R. This second reflected light $R_2$, as well as additional reflected light derivative of $R_2$, creates undesirable background light in the final display.

An alternative display system utilizing the GLV type device includes the red, green, and blue lasers, red, green, and blue illumination optics; first, second, and third GLV type devices; the dichroic filter group; the projection optics; the scanning mirror; and the display electronics. The red, green, and blue lasers, via the red, green, and blue illumination optics, illuminate the first, second, and third GLV type devices, respectively. The first, second, and third GLV type devices produce the linear arrays of the red, green, and blue pixels, respcetively, in response to signals from the display electronics. The dichroic filter group directs the light from the linear arrays of the red, green, and blue pixels to the Schlieren optics, which allows at least the plus one and minus one diffraction order, $D_{+1}$ and $D_{-1}$, to pass the Schlieren optics. The projection optics, via the scanning mirror, project the linear arrays of the red, green, and blue pixels onto the display screen while the scanning mirror, driven by the display electronics, scans the linear arrays of the red, green, and blue pixels across the display screen. Thus, the alternative display system produces the two dimensional color image on the display screen.

Examples of applications for a GLV type device based display system include a home entertainment system, a boardroom application, and a cinema application among others. In the home entertainment system or the boardroom application, the GLV type device based display system projects the two dimensional color image onto the display screen located on a wall. In the cinema application, the GLV type device based display system projects the two dimensional color image from a display booth onto a cinema screen.

A GLV type device based display system may also be utilized in printing applications. In such a case, the system would not include a scanning mirror, and the printing media, replacing a screen, would move to effectuate printing from a fixed line of light.

What is needed is a method of reducing the problems of space, heat, noise, and vibration in the home entertainment system, the boardroom application, and the cinema application. The problem of heat in various applications affects the operation of the GLV type device and shortens the GLV type device's life span. Specifically, illumination intensity affects the operation of the GLV type device and ultimately shortens the GLV type device lifespan when a GLV type device is positioned at the focal plane of a line illumination. Typically, the optical focal point in a system such as this is at the GLV type device modulator, thereby exposing the GLV type device to high optical intensities anywhere from 50 Watts to 100 Watts per color. These intensities must be reduced in order to preserve the high quality function of the GLV type device over longer periods of time, thus extending the overall life span of the GLV type device. What is also needed are methods for further correcting imperfections and defects in the line illumination that cause imperfections in the video display, while implementing an additional filtering step to eliminate more background light, thus further clarifying the display.

SUMMARY OF THE INVENTION

The present invention is a display apparatus and method for modulating light out of the focal plan in a grating light valve type device based projection system. The display apparatus and method includes positioning a grating light valve type device near but not at a focal plane of a line illumination such that the grating light valve type device produces either a two dimensional real image and a two dimensional virtual image.

The grating light valve type device in the present invention is also configured such that the modular members of the grating light valve type device are neither parallel nor perpendicular with the boundaries of the effective pixel area to broaden the width of the video line, thus correcting imperfections and striations attributable to ribbon defects. A seal glass is coupled with the grating light valve type device in such a manner that the line illumination must pass through the seal glass and an air gap between the seal glass and the grating light valve type device before reaching the grating light valve type device.

The present invention also embodies an absorbing aperture that is affixed to the outer surface of the seal glass at the focal plane of the line illumination in order to filter additional background light to achieve higher contrast, thus providing a much clearer picture.

BRIEF DESCRIPTION OF THE DRAWINGS

FIG. 7 illustrates an elevation view of the display optics of the present invention with the display optics unfolded along an optical axis.

DETAILED DESCRIPTION OF THE PREFERRED EMBODIMENT

Figure 1:
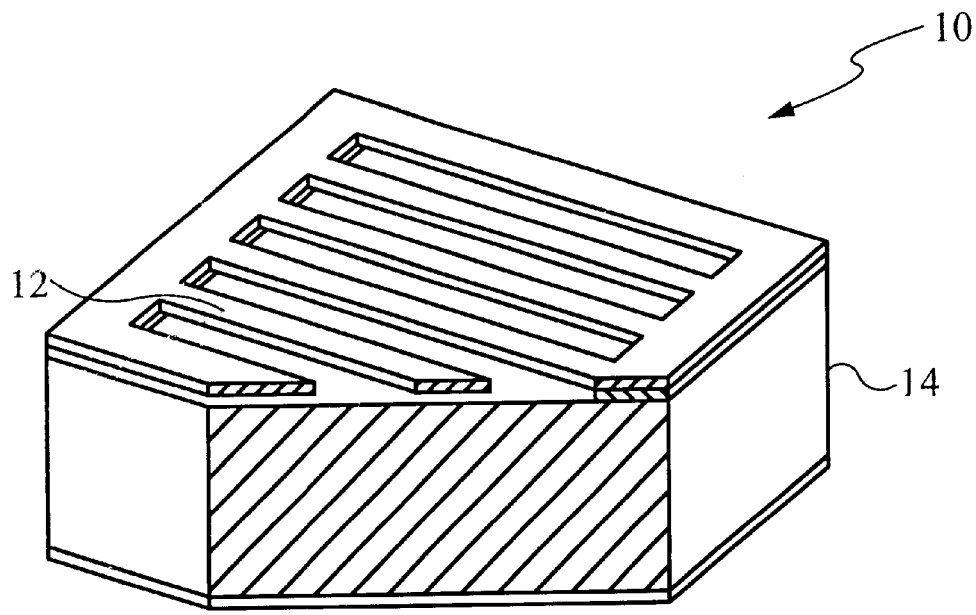
FIG. 1 illustrates an isometric view of a conventional grating light valve type device (GLV type device).
Figure 2A:
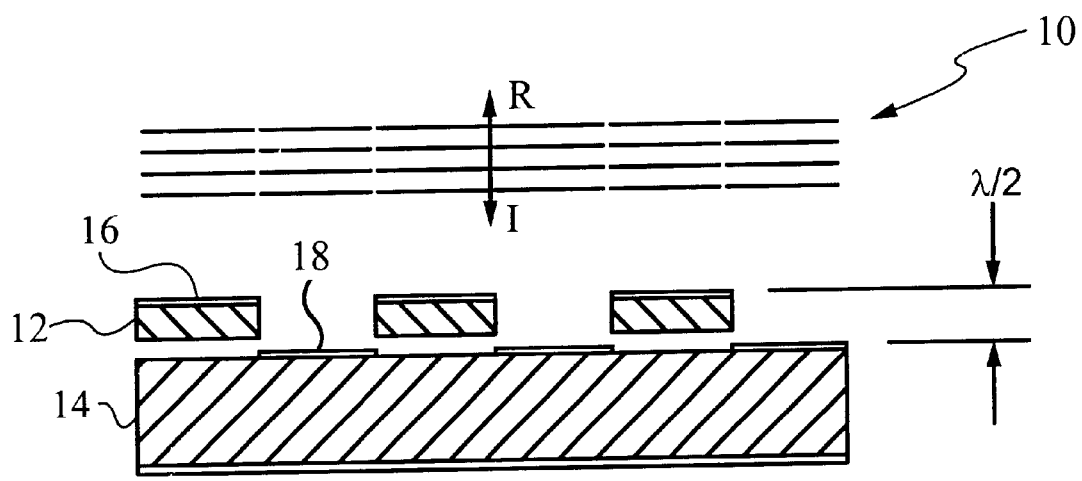
FIG. 2 illustrates a side view of the conventional GLV type device.
Figure 2B:
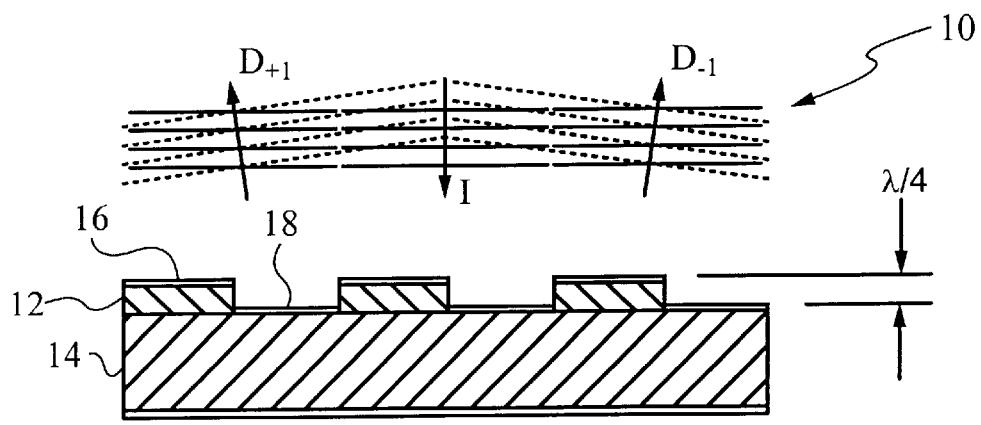
Figure 3A:
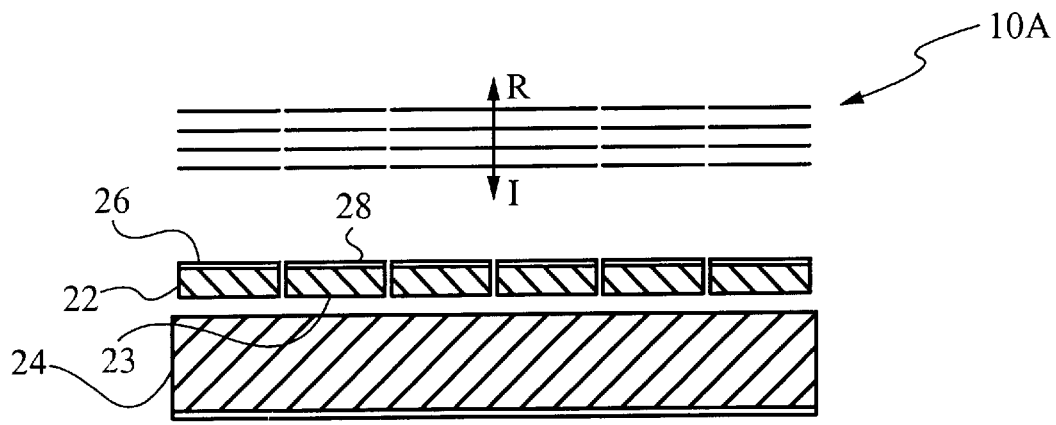
FIG. 3 illustrates a side view of an alternative conventional GLV type device.
Figure 3B:
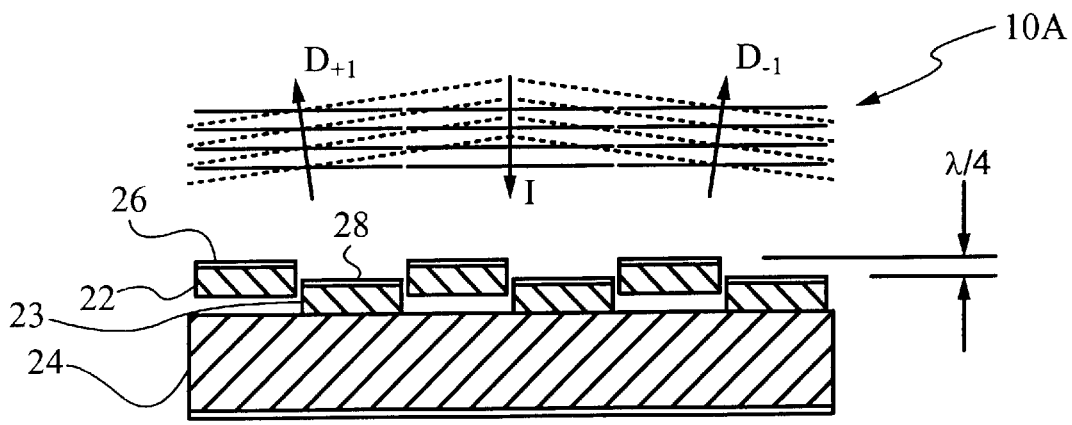
Figure 4:
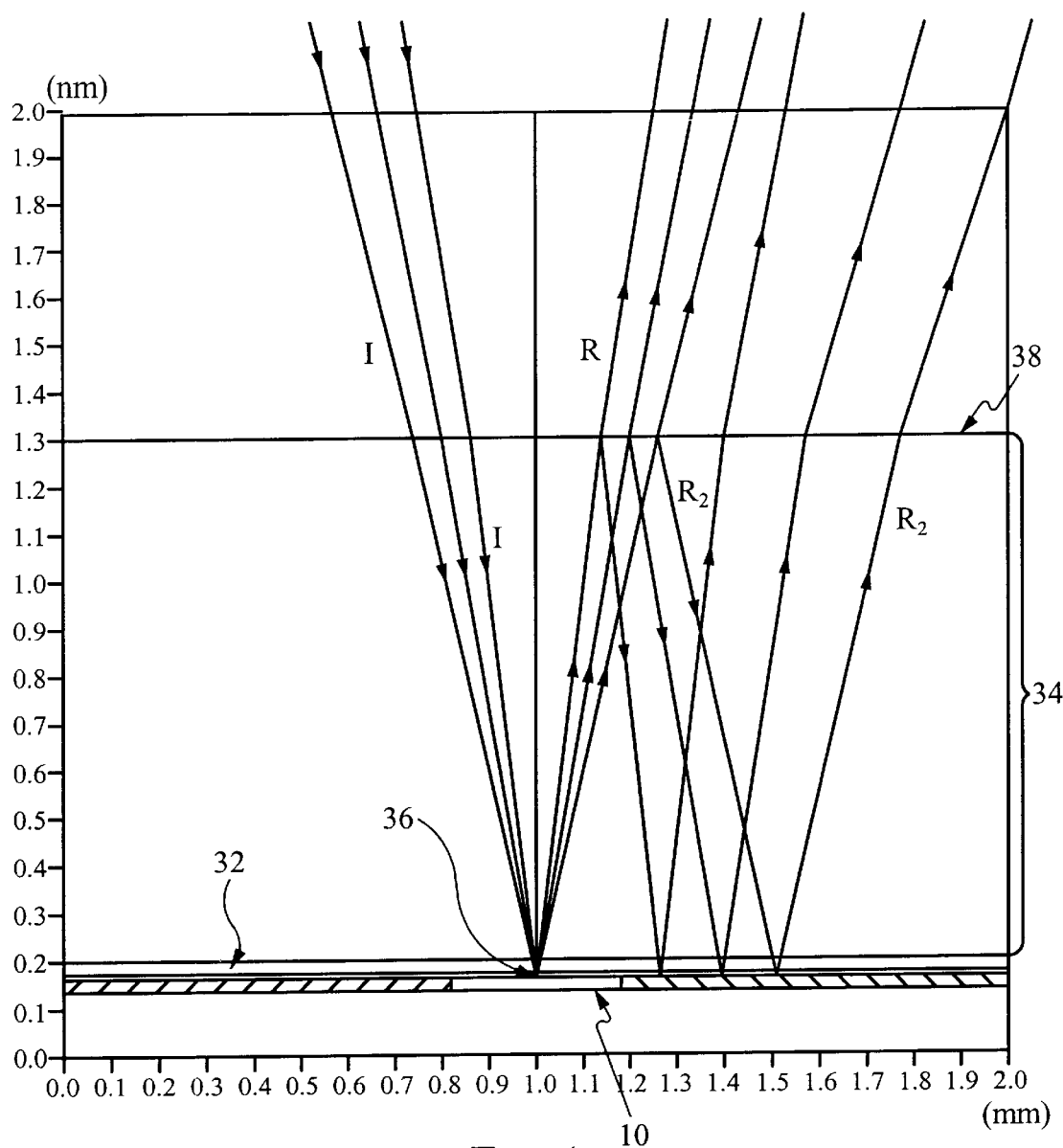
FIG. 4 illustrates a graphical top cross sectional view of a conventional GLV type device.
Figure 5:
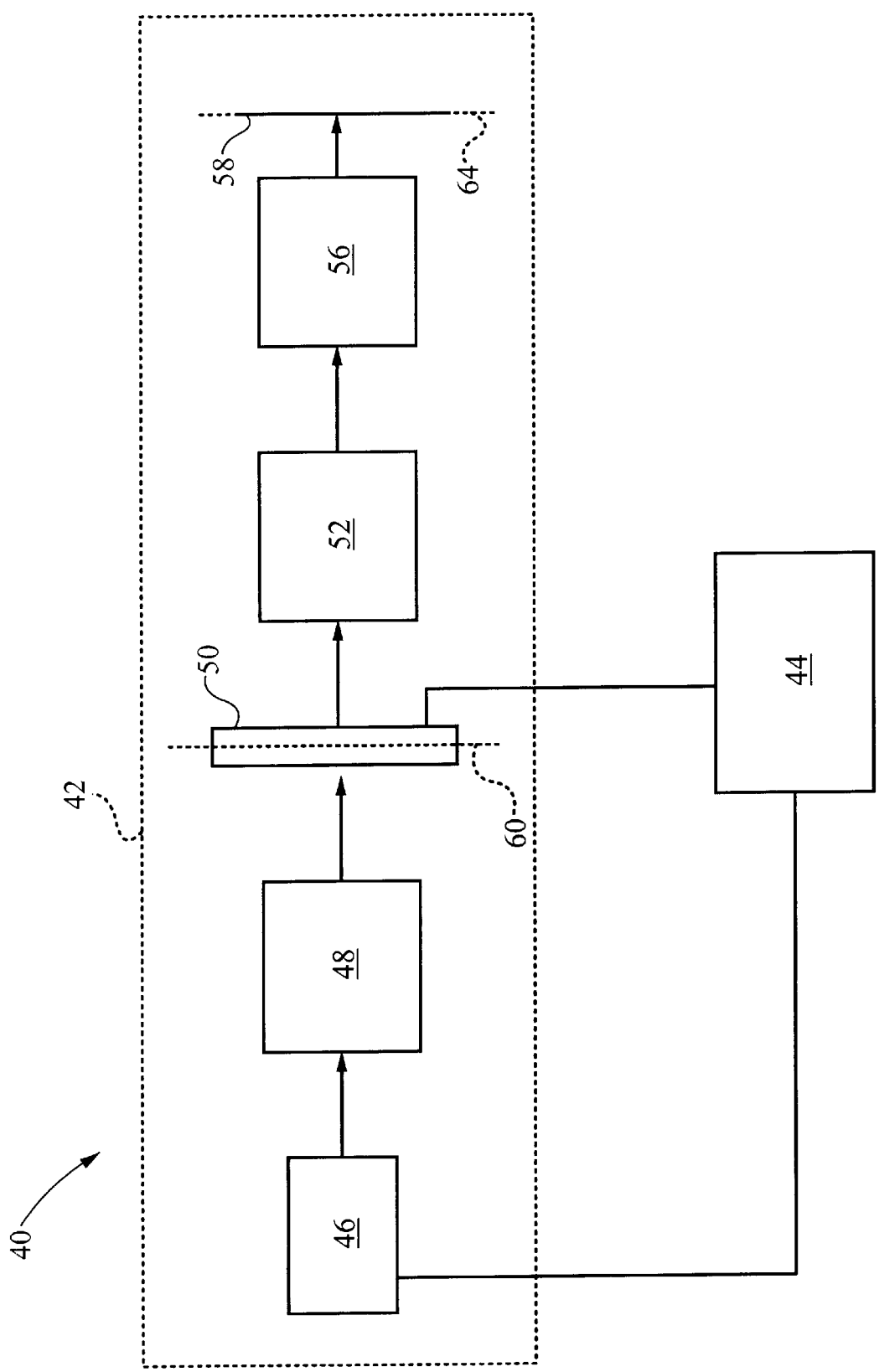
FIG. 5 schematically illustrates a display apparatus of the present invention.

A display system of the present invention is illustrated schematically in FIG. 5. The display system 40 includes display optics 42 and display electronics 44. The display optics 42 comprise a laser 46, illumination optics 48, a grating light valve type device (GLV type device) 50, Schlieren optics 52, projection and scanning optics 56, and a display screen 58. The display electronics 44 are coupled to the laser source 46, the GLV type device 50, and the projection and scanning optics 56.

The display electronics 44 power the laser 46. The laser 46 emits a laser illumination. The illumination optics 48 focus the laser illumination onto the GLV type device 50. The GLV type device 50 is located in a first image plane 60. The display electronics 44 control the GLV type device 50. The GLV type device 50 modulates the laser illumination forming reflected light or diffracted light for a linear array of pixels. The Schlieren optics 52 separates the reflected light from the diffracted light allowing at least plus one and minus one diffraction orders to pass the Schlieren optics 52.

The display electronics 44 drive a scanning mirror of the projection and scanning optics 56. The projection and scanning optics 56 project the line image onto the display screen 58 and scan the line image across the display screen 58 to form a two dimensional image on the display screen 58. The display screen 58 is located in a third image plane 64.

Figure 6:
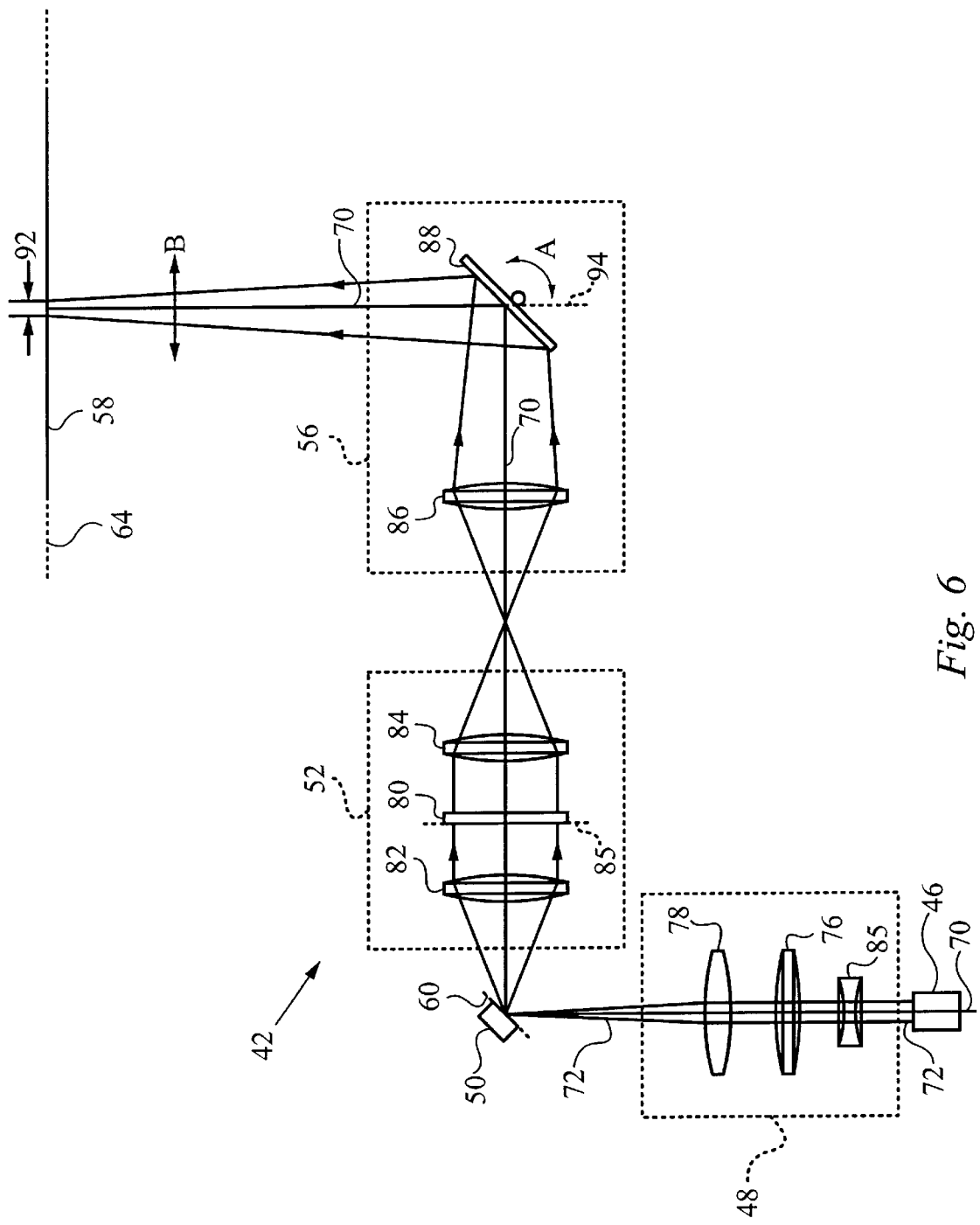
FIG. 6 illustrates a plan view of display optics of the present invention.

The display optics 42 of the present invention are further illustrated in FIGS. 6 and 7. FIG. 6 illustrates a plan view of the display optics 42. FIG. 7 illustrates an elevation view of the display optics 42, with the display optics 42 unfolded along an optic axis 70. The laser 46 emits the laser illumination 72. The illumination optics comprise a divergent lens 74, a collimation lens 76, and a cylindrical lens 78. The illumination optics 48 focus the laser illumination 72 onto the GLV type device 50 in a focus line having a focus width. Note that FIG. 6 illustrates the laser illumination 72 illuminating the GLV type device 50 with an angle of incidence of 45°. Ideally, the angle of incidence is a minimum angle of incidence which allows the laser illumination 72 to illuminate the GLV type device 50 while allowing the reflected and diffracted light to reach the Schlieren optics 52. It will be readily apparent to one skilled in the art that other optics arrangements can be used to illuminate the GLV type device 50. It will also be readily apparent to one skilled in the art that depiction of lenses in the present invention is not limited to single component lenses and that any given lens can be replaced with a compound lens or a reflective optical element.

The GLV type device 50 modulates the laser illumination 72 as the linear array of pixels along the focus line, forming the reflected light R or the diffracted light, including the plus one and minus one diffraction orders, $D_{+1}$ and $D_{-1}$, for each pixel. Preferably, the GLV type device 50 produces a linear array of 1,080 pixels. Alternatively, the GLV type device 50 produces more or less than 1,080 pixels. Note that FIG. 7 illustrates the reflected light R and the plus one and minus one diffraction orders, $D_{+1}$ and $D_{-1}$, for two pixels for illustration purposes. If a given pixel is modulated to reflect light, the reflected light R will be present and the plus one and minus one diffraction orders, $D_{+1}$ and $D_{-1}$, will not be present. Alternatively, if the given pixel is modulated to diffract light, the plus one and minus one diffraction orders, $D_{+1}$ and $D_{-1}$, will be present and the reflected light R will not be present. In some instances it is desirable to modulate the given pixel to produce the reflected light R and the plus one and minus one diffraction orders, $D_{+1}$ and $D_{-1}$, in order to reduce a brightness of the given pixel in a resulting image, which provides a gray scale effect in the resulting image.

Figure 8:
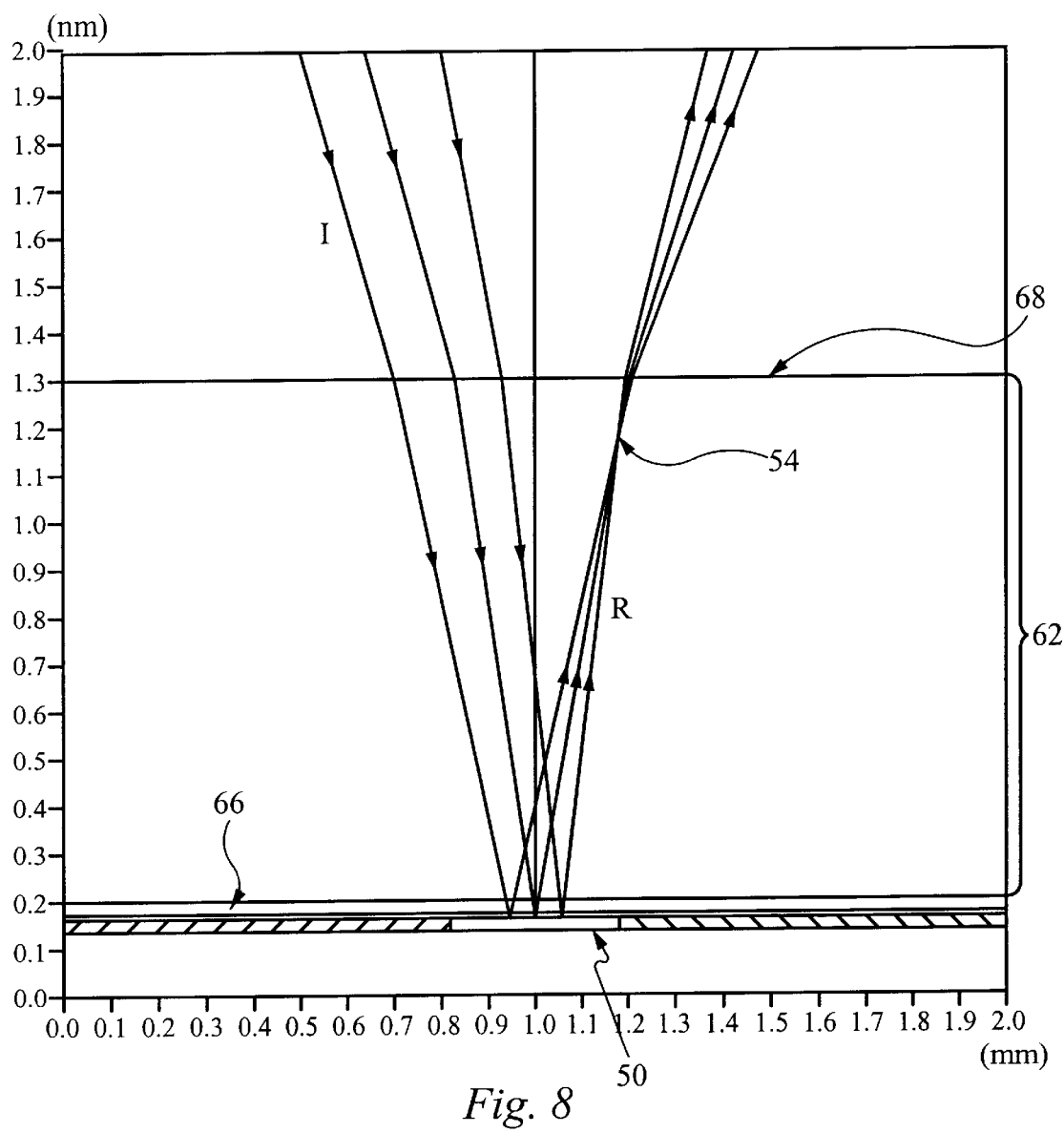
FIG. 8 illustrates a graphical top cross sectional view of the GLV type device of the preferred embodiment of the present invention.

FIG. 8 is a graphical top cross sectional view of the GLV type device 50 of the preferred embodiment of the present invention. A scale in millimeters is provided to show an approximate layout of the system. Here, the GLV type device 50 is positioned such that the focal point 54 of the incident light I is near but not on the surface of the GLV type device 50. A seal glass 62 is positioned over the GLV type device 50 forming an air gap 66 between the GLV type device 50 and the seal glass 62. The seal glass 62 permits the incident light I to pass to the air gap 66 and to the GLV type device 50. In the preferred embodiment of the present invention, the GLV type device 50 is positioned such that the focal point 54 occurs beyond the surface of the GLV type device 50 as depicted in FIG. 8. After the incident light I reaches the GLV type device 50, the reflected light R travels through the air gap 66 and the seal glass 62 and into the Schlieren optics 52. The outer surface 68 of the seal glass 62 may further reflect a portion of the reflected light R producing unwanted background light. An additional remedy to this problem will be introduced in the alternative embodiment.

In the preferred embodiment of the present invention, the GLV type device 50 is positioned such that the focal point 54 is positioned at the outer surface 68 of the seal glass 62. It will be readily apparent to one skilled in the art that the arrangement of the GLV type device 50 and the seal glass 62 is not limited to the arrangement depicted in FIG. 8.

Referring back to FIG. 7, the Schlieren optics 52 include a Schlieren stop 80 located between first and second relay lenses, 82 and 84. The Schlieren stop 80 stops the reflected light R and allows the plus one and minus one diffraction orders, $D_{+1}$ and $D_{-1}$, to pass the Schlieren stop 80. The Schlieren stop 80 is preferably located in a first transform plane 85. Alternatively, the Schlieren stop 80 is located near the first transform plane 85.

The projection and scanning optics 56 comprise a projection lens 86 and the scanning mirror 88. The projection lens 86, via the scanning mirror 88, projects the line image 90 onto the display screen 58. The projection lens 86 also reforms the wavefront having the spatial phase variation across the line image width 92 on the display screen 58. The scanning mirror 88 is preferably located at about a second transform plane 94.

The scanning mirror 88 moves with a first scan motion A and, thus, scans the line image 90 across the display screen 58 with a second scan motion B. Preferably, the first scan motion A is a sawtooth scan motion where a first part of a scan cycle illuminates the display screen 58 and a second part of the scan cycle returns the scanning mirror 88 back to a beginning of the scan cycle. By repeatedly scanning the line image 90 across the display screen 58, a two dimensional image is formed on the display screen 58. It will be readily apparent to one skilled in the art that other scan motions can be used to scan the line image 90 across the display screen 58. It will also be readily apparent to one skilled in the art that a transmissive scanning device such as an objective scanner having zero optical power can replace the scanning mirror 88.

As the line image 90 scans across the display screen 58, the GLV type device 50 modulates the linear array of pixels thus producing the two dimensional image made up of a rectangular array of pixels. For a high definition television (HDTV) format, the GLV type device 50 modulates 1,920 times as the line image 90 scans across the display screen 58. Thus, the GLV type device 50 preferably produces a 1,920 by 1,080 rectangular array forming the two dimensional image for the HDTV format. For other picture formats, the GLV type device 50 modulates more or less than the 1,920 times as the line image 90 scans across the display screen 58 depending upon which of the other picture formats is being displayed.

As the line image width 92 scans across the display screen 58, the wavefront having the spatial phase variation produces the multiple speckle patterns with time. The multiple speckle patterns reduce the speckle that is detected by the eye or the intensity detector of the optical system.

The display optics 42 depicted in FIGS. 5, 6, and 7 produce a monochrome image. Color display optics comprise the display optics 42, two additional lasers, two additional illumination optics, two additional GLV type device's, and a dichroic filter group. In the color display optics, red, green, and blue lasers illuminate the three GLV type device's producing red, green, and blue linear arrays of pixels. The dichroic filter group combines the reflected and diffracted light from the three GLV type device's and directs the reflected and diffracted light to the Schlieren optics 52. For the color display optics, the spatial phase variation across the line image width 92 preferably has an optimum amplitude for one of red, green, and blue laser illuminations (e.g., the green laser illumination), or a wavelength that is a specific average of participating wavelengths. The red, green, and blue wavefronts produce the multiple speckle patterns over time as the line image 90 is scanned across the display screen 58 and, thus, reduce the speckle in the color display optics. Alternatively, in the color display optics, the dichroic filter group combines the red, green, and blue laser illuminations to sequentially illuminate a single GLV type device.

Figure 9:
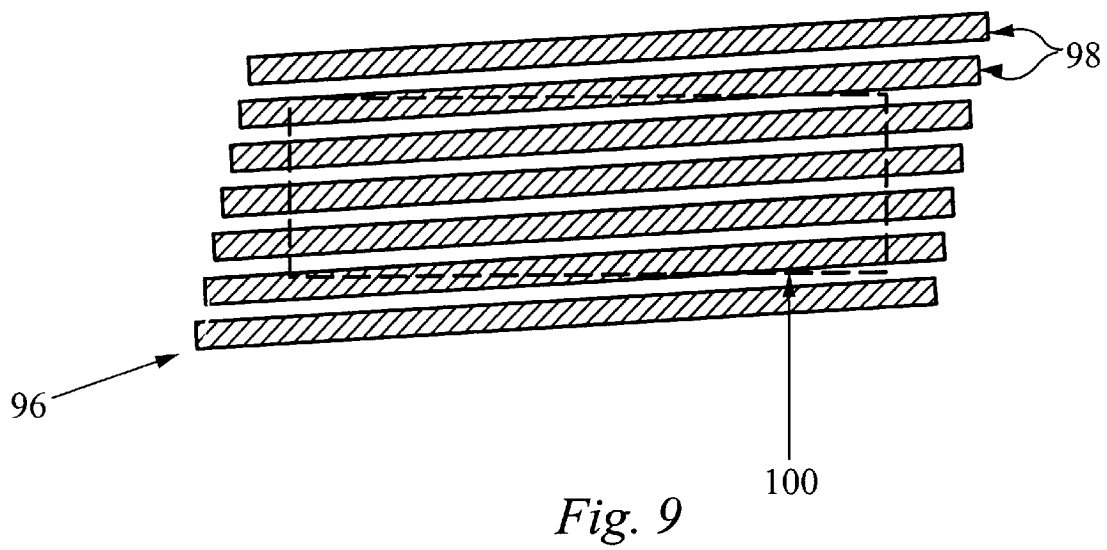
FIG. 9 illustrates a front view of the GLV type device of an alternative embodiment of the present invention.

Alternative embodiments of the present invention may include an angled GLV type device 96 as depicted in FIG. 9. Referring simultaneously to FIG. 6, FIG. 8, and FIG. 9, the Schlieren optics 52 and scanning optics 56 must now use the focal point 54 as the object for projection, not the GLV type device 50 itself, in order to recover a square pixel. The moveable elongated elements 98 of an angled GLV type device 96 are positioned such that they are neither parallel nor perpendicular with the boundaries of the effective pixel area 100. This configuration of the moveable elongated elements 98 allows striations, artifacts or imperfections within the angled GLV type device 96 to be smeared out within the effective pixel area 100, rather than be dragged across the entire picture. This is particularly important for defects running the length of the ribbon such as ribbon bow tilt and deflection. By eliminating these problems within the effective pixel area 100, a softer picture is attained. Additionally, an angled GLV type device 96 reduces scanning defects and functions optimally with a wide illumination beam.

Figure 10:
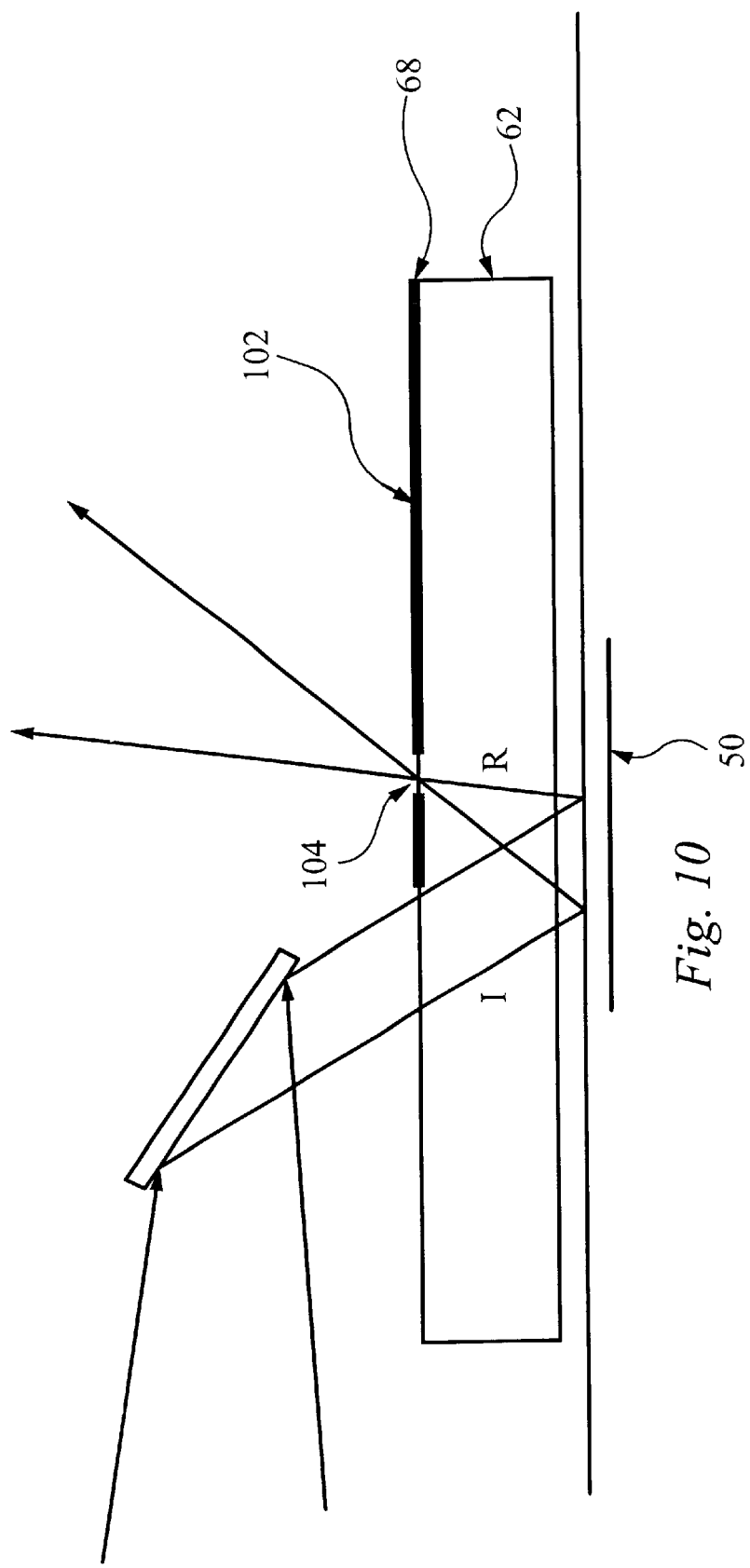
FIG. 10 illustrates a top view of a GLV type device system of an alternative embodiment of the present invention.
Figure 11:
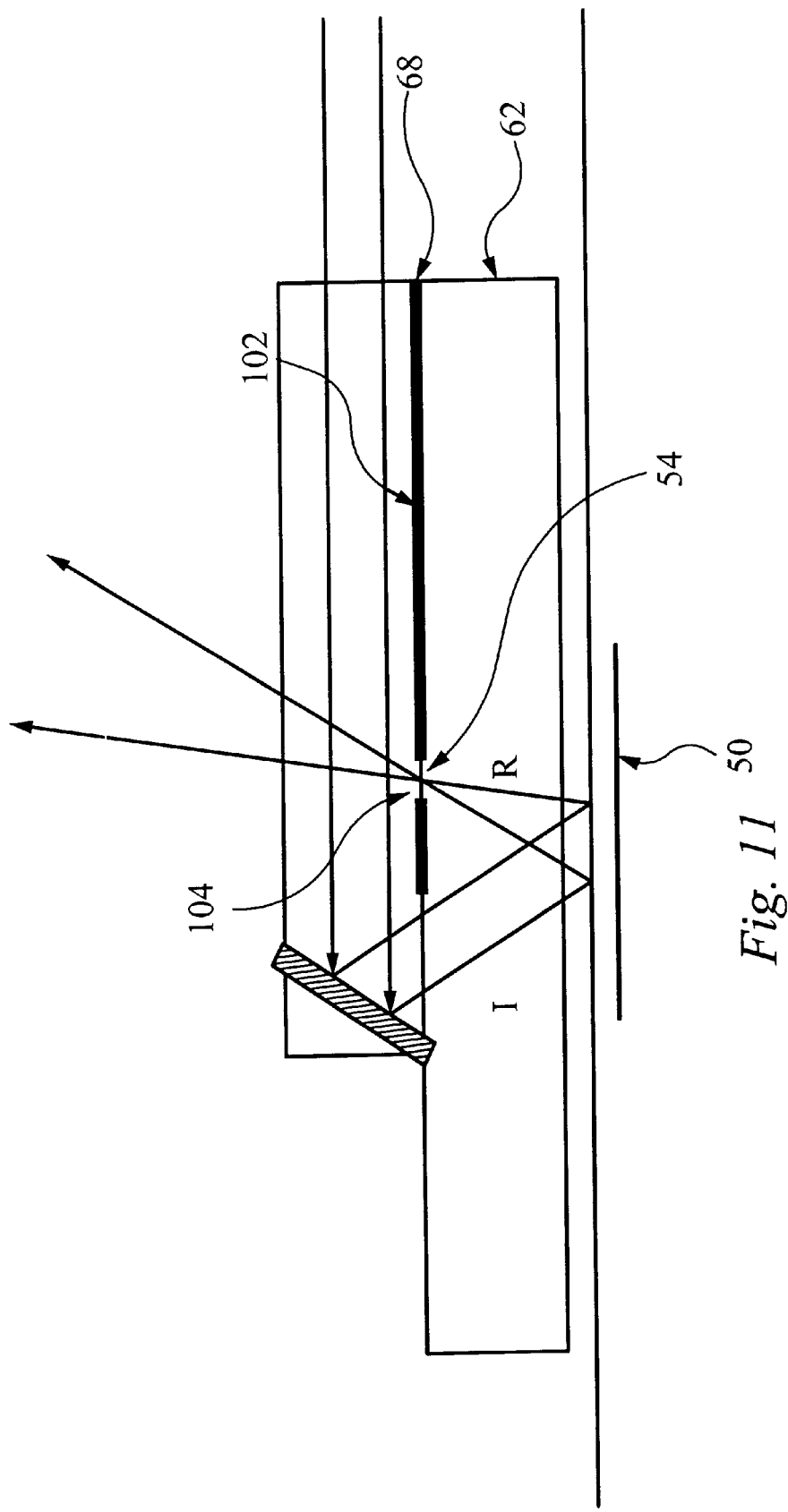
FIG. 11 illustrates a top view of a GLV type device system of an alternative embodiment of the present invention.

Another alternative embodiment of the present invention is depicted in FIGS. 10 & 11. In these two drawings, an absorbing aperture 102 is affixed to the outer surface 68 of the seal glass 62. The absorbing aperture 102 is fashioned such that it has an opening 104 where the focal point 54 meets the outer surface 68 of the seal glass 62. This alternative embodiment can be easily implemented in that it can be affixed away from the surface of the GLV type device 50 before the seal glass 62 is put in place above the GLV type device 50. This absorbing aperture 102 is implemented to block additional background light while allowing the reflected light R to pass to the Schlieren optics 52, thus improving the picture contrast and overall quality.

One modification to the preferred embodiment may include, but is not limited to, implementing a standard GLV type device rather than a blazed type. This modification can be implemented if throughput is not an issue, as in some printing applications. In which case, one of the diffraction orders would simply be ignored. Additionally, the technique in the preferred embodiment is also applicable to monochrome systems, since the single color would still be on-axis for the projection system.

It will be readily apparent to one skilled in the art that other various modifications may be made to the preferred embodiment without departing from the spirit and scope of the invention as defined by the appended claims.

I claim:

1. A display apparatus comprising:
    a. a light modulator positioned such that a focal plane of a line illumination is not located on the light modulator, and in operation the light modulator produces a linear image;
    b. a focusing arrangement coupled to the linear image; and
    c. a scanning device coupled to the linear image such that in operation the focusing arrangement and the scanning device produce a two dimensional image.

2. The display apparatus as claimed in claim 1 wherein the two dimensional image is a real image.

3. The display apparatus as claimed in claim 1 wherein the two dimensional image is a virtual image.

4. The display apparatus as claimed in claim 1 wherein the light modulator is configured such that a plurality of modular members of the light modulator are not parallel with respect to an effective pixel area of the line illumination.

5. The display apparatus as claimed in claim 1 wherein the light modulator is configured such that the plurality of modular members of the light modulator are not perpendicular with respect to the effective pixel area of the line illumination.

6. The display apparatus as claimed in claim 1 wherein a seal glass is coupled with the light modulator such that the line illumination passes through the seal glass before reaching the light modulator.

7. The display apparatus as claimed in claim 6 wherein the seal glass is coupled with the light modulator such that an air gap is formed between the seal glass and the light modulator.

8. The display apparatus as claimed in claim 6 wherein an absorbing aperture is affixed to a surface of the seal glass, said surface of the seal glass positioned at the focal plane of the line illumination.

9. A method of modulating light out of the focal plane in a light modulator based projection system comprising:
    a. positioning a light modulator such that a focal plane of a line illumination is not located on the light modulator, and in operation the light modulator produces a linear image;
    b. coupling a focusing arrangement to the linear image; and
    c. coupling a scanning device to the linear image such that in operation the focusing arrangement and the scanning device produce a two dimensional image.

10. The method as claimed in claim 9 further comprising the two dimensional image being a real image.

11. The method as claimed in claim 9 further comprising the two dimensional image being a virtual image.

12. The method as claimed in claim 9 further comprising configuring the light modulator such that a plurality of modular members of the light modulator are not parallel with respect to an effective pixel area of the line illumination.

13. The method as claimed in claim 9 further comprising configuring the light modulator such that the plurality of modular members of the light modulator are not perpendicular with respect to the effective pixel area of the line illumination.

14. The method as claimed in claim 9 further comprising coupling a seal glass with the light modulator such that the line illumination passes through the seal glass before reaching the light modulator.

15. The method as claimed in claim 14 further comprising coupling the seal glass with the light modulator such that an air gap is formed between the seal glass and the light modulator.

16. The method as claimed in claim 14 further comprising affixing an absorbing aperture to a surface of the seal glass, said surface of the seal glass positioned at the focal plane of the line illumination.

17. A display system comprising:
    a. means for modulating light positioned such that a focal plane of a line illumination is not located on the means for modulating, and in operation the means for modulating produces a linear image;
    b. means for focusing coupled to the linear image; and
    c. means for scanning coupled to the linear image such that in operation the means for focusing and the means for scanning produce a two dimensional image.

18. The display system as claimed in claim 17 wherein the two dimensional image is a real image.

19. The display system as claimed in claim 17 wherein the two dimensional image is a virtual image.

20. The display system as claimed in claim 17 wherein the means for modulating is configured such that a plurality of modular members of the means for modulating are not parallel with respect to an effective pixel area of the line illumination.

21. The display system as claimed in claim 17 wherein the means for modulating is configured such that the plurality of modular members of the means for modulating are not perpendicular with respect to the effective pixel area of the line illumination.

22. The display system as claimed in claim 17 further comprising means for sealing coupled with the means for modulating such that the line illumination passes through the means for sealing before reaching the means for modulating.

23. The display system as claimed in claim 22 wherein the means for sealing is coupled with the means for modulating such that an air gap is formed between the means for sealing and the means for modulating.

24. The display system as claimed in claim 22 further comprising means for absorbing affixed to a surface of the means for sealing, said surface of the means for sealing positioned at the focal plane of the line illumination.

25. A display apparatus for modulation of light out of the focal plane in a light modulator based projection system comprising:
   a. a light modulator positioned such that a focal plane of a line illumination is not located on the light modulator and configured such that a plurality of modular members of the light modulator are neither parallel nor perpendicular with respect to an effective pixel area of the line illumination, said light modulator positioned such that in operation the light modulator produces a linear image;
   b. a focusing arrangement coupled to the linear image;
   c. a scanning device coupled to the linear image such that in operation the focusing arrangement and the scanning device produce a two dimensional image;
   d. a seal glass coupled with the light modulator such that the line illumination passes through the seal glass before reaching the light modulator and such that an air gap is formed between the seal glass and the light modulator; and
   e. an absorbing aperture affixed to a surface of the seal glass, said surface of the seal glass positioned at the focal plane of the line illumination.

26. The display apparatus as claimed in claim 25 wherein the two dimensional image is a real image.

27. The display apparatus as claimed in claim 25 wherein the two dimensional image is a virtual image.

28. A light valve comprising:
   a. a light modulator configured to receive an illumination from an illumination source such that the illumination source is not focused on the light modulator; and
   b. a focusing arrangement coupled to the illumination source such that the focusing arrangement focuses the illumination onto a target.

29. The light valve as claimed in claim 28 wherein the focusing arrangement produces a two dimensional image, where the two dimensional image is a real image.

30. The light valve as claimed in claim 28 wherein the focusing arrangement produces a two dimensional image, where the two dimensional image is a virtual image.

31. The light valve as claimed in claim 28 wherein the light modulator is configured such that a plurality of modular members of the light modulator are not parallel with respect to an effective pixel area of the illumination.

32. The light valve as claimed in claim 28 wherein the light modulator is configured such that the plurality of modular members of the light modulator are not perpendicular with respect to the effective pixel area of the illumination.

33. The light valve as claimed in claim 28 wherein a seal glass is coupled with the light modulator such that the illumination passes through the seal glass before reaching the light modulator.

34. The light valve as claimed in claim 33 wherein the seal glass is coupled with the light modulator such that an air gap is formed between the seal glass and the light modulator.

35. The light valve as claimed in claim 33 wherein an absorbing aperture is affixed to a surface of the seal glass, said surface of the seal glass positioned at the focal plane of the illumination.

36. The display apparatus as claimed in claim 1 wherein the light modulator comprises a grating light valve type device.

37. The display apparatus as claimed in claim 25 wherein the light modulator comprises a grating light valve type device.

38. The light valve as claimed in claim 28 wherein the light modulator comprises a grating light valve type device.

* * * * *

UNITED STATES PATENT AND TRADEMARK OFFICE
CERTIFICATE OF CORRECTION

PATENT NO. : 6,614,580 B2
DATED : September 2, 2003
INVENTOR(S) : David T. Amm

It is certified that error appears in the above-identified patent and that said Letters Patent is hereby corrected as shown below:

<u>Title page,</u>
Item [56], References Cited, U.S. PATENT DOCUMENTS, add:

| | | | | | |
|---|---|---|---|---|---|
| -- 5,847,859 | 12/08/98 | Murata | 359 | 201 | 03/19/96 |
| 6,172,796 B1 | 01/09/01 | Kowarz et al. | 359 | 290 | 12/18/98 |
| 6,268,952 B1 | 07/31/01 | Godil et al. | 359 | 291 | 07/14/99 |
| 6,445,502 B1 | 09/03/02 | Islam et al. | 359 | 571 | 02/02/01 --. |

<u>Column 2,</u>
Line 7, replace "incident light Ito" with -- incident light I to --.
Line 61, replace "the red, green, and blue lasers, red," with -- the red, green, and blue lasers; red, --.

Signed and Sealed this

Sixth Day of January, 2004

JAMES E. ROGAN
*Director of the United States Patent and Trademark Office*